(12) United States Patent
Ono

(10) Patent No.: US 8,782,715 B2
(45) Date of Patent: Jul. 15, 2014

(54) COMMUNICATION APPARATUS

(75) Inventor: Tachio Ono, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 495 days.

(21) Appl. No.: 12/668,334

(22) PCT Filed: Jul. 24, 2008

(86) PCT No.: PCT/JP2008/063718
§ 371 (c)(1),
(2), (4) Date: Jan. 8, 2010

(87) PCT Pub. No.: WO2009/020030
PCT Pub. Date: Feb. 12, 2009

(65) Prior Publication Data
US 2010/0175094 A1    Jul. 8, 2010

(30) Foreign Application Priority Data
Aug. 3, 2007  (JP) .................................. 2007-203241

(51) Int. Cl.
*H04N 7/18*   (2006.01)
*H04N 7/173*  (2011.01)
(52) U.S. Cl.
USPC .................................. 725/79; 725/74; 725/86
(58) Field of Classification Search
USPC ......................................... 725/79, 58, 74, 86
See application file for complete search history.

(56) References Cited

U.S. PATENT DOCUMENTS

| | | | |
|---|---|---|---|
| 2003/0210898 A1* | 11/2003 | Juen et al. ...................... | 386/117 |
| 2004/0143771 A1* | 7/2004 | Minabe et al. ................ | 713/300 |
| 2004/0170398 A1* | 9/2004 | Nishigaki ...................... | 386/125 |
| 2005/0015805 A1* | 1/2005 | Iwamura ......................... | 725/79 |
| 2006/0174280 A1* | 8/2006 | Choi ............................... | 725/58 |

FOREIGN PATENT DOCUMENTS

| JP | 02-202611 A | 8/1990 |
|---|---|---|
| JP | 2000-350386 A | 12/2000 |
| JP | 2001-245442 A | 9/2001 |
| JP | 2002-049442 A | 2/2002 |
| JP | 2002-246964 A | 8/2002 |
| JP | 2003-134693 A | 5/2003 |
| JP | 2004-007497 A | 1/2004 |
| JP | 2007-189794 A | 7/2007 |

* cited by examiner

*Primary Examiner* — Pankaj Kumar
*Assistant Examiner* — Alazar Tilahun
(74) *Attorney, Agent, or Firm* — Cowan, Liebowitz & Latman, P.C.

(57) ABSTRACT

A communication apparatus comprises a connecting unit for connecting with a power line, a circuit for receiving a power supply through the connecting unit, and a communicating unit for communicating with an external apparatus through the connecting unit, a controlling unit for determining whether or not to permit a power supply stop, in accordance with the communicating unit receiving information on a request for the power supply stop, and controlling the communicating unit to transmit response data corresponding to the determination.

12 Claims, 13 Drawing Sheets

FIG. 5
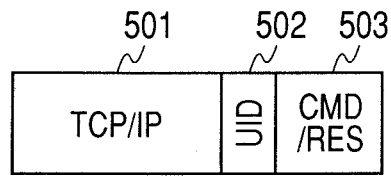
FIG. 6
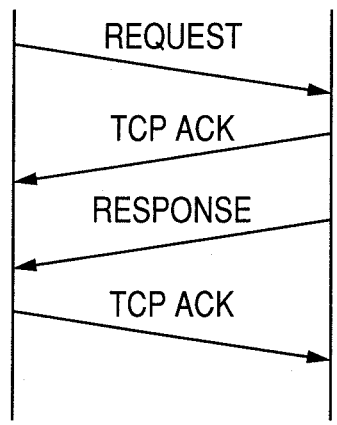
FIG. 7
| 0x0000001 | POWER SUPPLY STOP REQUEST |
| --- | --- |
| 0x0000002 | BACKUP DATA TRANSMISSION |
FIG. 8
| 0x8000001 | DISAPPROVE |
| --- | --- |
| 0x8000002 | PERMISSION |

FIG. 16

| CATEGORY 1601 | APPARATUS ID 1602 | MAC 1603 | IP 1604 |
|---|---|---|---|
| ROOM 1402a | HUMAN DETECTION SENSOR 1406a | AA:BB:CC:DD:EE:01 | 111.111.000.001 |
| ROOM 1402a | TV 1404 | AA:BB:CC:DD:EE:02 | 111.111.000.002 |
| ROOM 1402a | RECORDER 1405a | AA:BB:CC:DD:EE:03 | 111.111.000.003 |
| ROOM 1402b | HUMAN DETECTION SENSOR 1406b | AA:BB:CC:DD:EE:04 | 111.111.000.004 |
| ROOM 1402b | RECORDER 1405b | AA:BB:CC:DD:EE:05 | 111.111.000.005 |
| ROOM 1402b | PC 1407 | AA:BB:CC:DD:EE:06 | 111.111.000.006 |

COMMUNICATION APPARATUS

TECHNICAL FIELD

The present invention relates to a communication for apparatus, particularly, to an apparatus communicating with an external apparatus connected thereto.

BACKGROUND ART

In recent years, a technique has been proposed which connects a home electrical apparatus with a network to control each apparatus by communicating through the network.

A power line communication (PLC) is noticed as such a technique for realizing a home network. The PLC is a method which superimposes a high frequency signal on a existing power line of 100 V (50/60 Hz), and bidirectionally communicates by using the power line as a transmission channel (for example, refer to Japanese Patent Application Laid-Open No. 2004-007497).

In the PLC, since an existing power incoming line and an existing power outlet can be utilized as they are, new wiring works are not required. In addition, in the PLC, since the communication can be executed only by inserting a plug to the outlet, the plug and play can be executed without a complex setting.

When connecting and controlling the home electrical apparatus with the network such as the PLC, each apparatus is required to cause a circuit for receiving a control signal from the network to constantly operate.

Thus, the standby power, which is consumed when the power is off, becomes large, as a result, the total electricity consumption becomes large. This is a problem.

Thus, a system has been proposed, which controls the power of an apparatus connected to the network, (for example, refer to Japanese Patent Application Laid-Open No. H02-202611). According to Japanese Patent Application Laid-Open No. H02-202611, a system is proposed, which controls the power supply to the apparatus on the network.

However, in the configuration of Japanese Patent Application Laid-Open No. H02-202611, regardless of a condition of the connected apparatus, the power supply to the connected apparatus is stopped.

Thus, a problem may be raised depending on the condition of the connected apparatus.

For example, in a case where the connected apparatus is a recorder which receives and records a television broadcast, if the power supply is stopped while recording, the recording is stopped halfway. This is a problem.

DISCLOSURE OF THE INVENTION

It is an aspect of the invention to solve such problems and appropriately respond to a request for stopping the power supply, thereby reducing the electricity consumption.

According to an aspect of the present invention, a communication apparatus comprises a connecting unit for connecting with a power line; a receiving unit for receiving a power supply through the connecting unit; a communicating unit for communicating with an external apparatus through the connecting unit; and a controlling unit for determining whether or not to permit a power supply stop, in accordance with the communicating unit receiving information on a request for a power supply stop, and controlling the communicating unit to transmit response data corresponding to the determination.

According to another aspect of the present invention, a communication apparatus comprises a tuner for receiving a television broadcast and outputting an image signal of a broadcast program; a recording unit for recording the image signal output from the tuner on a recording medium; a setting unit for setting a scheduled recording by the recording unit; a connecting unit for connecting with a power line; a receiving unit for receiving a power supply through the connecting unit; a communicating unit for communicating with an external apparatus through the connecting unit; a detecting unit for detecting whether or not the scheduled recording is set by the setting unit, if the communicating unit receives information on a request for a power supply stop; and a controlling unit for controlling the communicating unit to transmit response data indicating that the power supply stop is disapproved, if the detecting unit detects that the scheduled recording is set, and to transmit the response data indicating that the power supply stop is permitted, if the detecting unit detects that the scheduled recording is not set.

Further features and aspects of the present invention will become apparent from the following description of exemplary embodiments with reference to the attached drawings.

BRIEF DESCRIPTION OF THE DRAWINGS

FIG. 5 is a diagram illustrating communication data;

FIG. 6 is a diagram illustrating communication;

FIG. 7 is a diagram illustrating a value stored in a command part of the communication data;

FIG. 8 is a diagram illustrating a value stored in a command part of response data;

FIG. 16 is a diagram illustrating management information; and

BEST MODE FOR CARRYING OUT THE INVENTION

Exemplary embodiments of the present invention will be described in detail by using the drawings.

Figure 1:
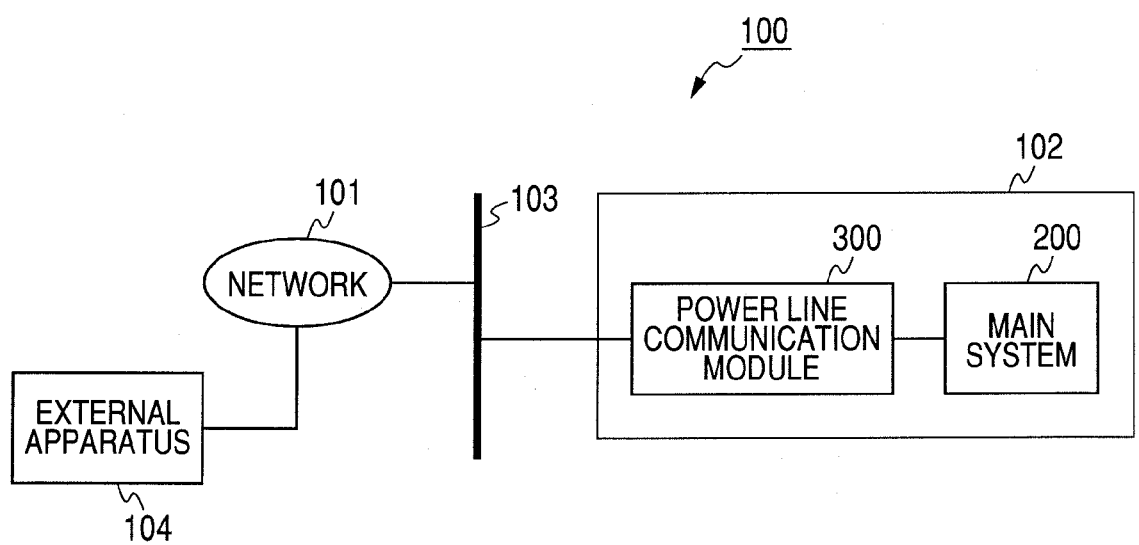
FIG. 1 is a diagram illustrating a power line communication system according to an exemplary embodiment.

FIG. 1 illustrates a configuration of a home communication system 100 using the PLC according to a first embodiment of the present invention.

In the communication system 100 of FIG. 1, a communication apparatus 102 is connected to a home power line 103.

An external network 101 is connected to the power line 103, and data can be communicated by the PLC between an external apparatus 104 on the network 101 and the communication apparatus 102. Meanwhile, in the present embodiment, it is assumed that the external apparatus 104 is an apparatus which can control to supply the power to a recorder 102 of the present embodiment.

The communication apparatus 102 is configured with a power line communication module 300 adapted to communicate data with the PLC through the power line 103 and a main system 200 adapted to realize other functions. In the present embodiment, such a case will be described that the communication apparatus 102 is configured with a recorder which receives, records, and reproduces the television broadcast.

Figure 2:
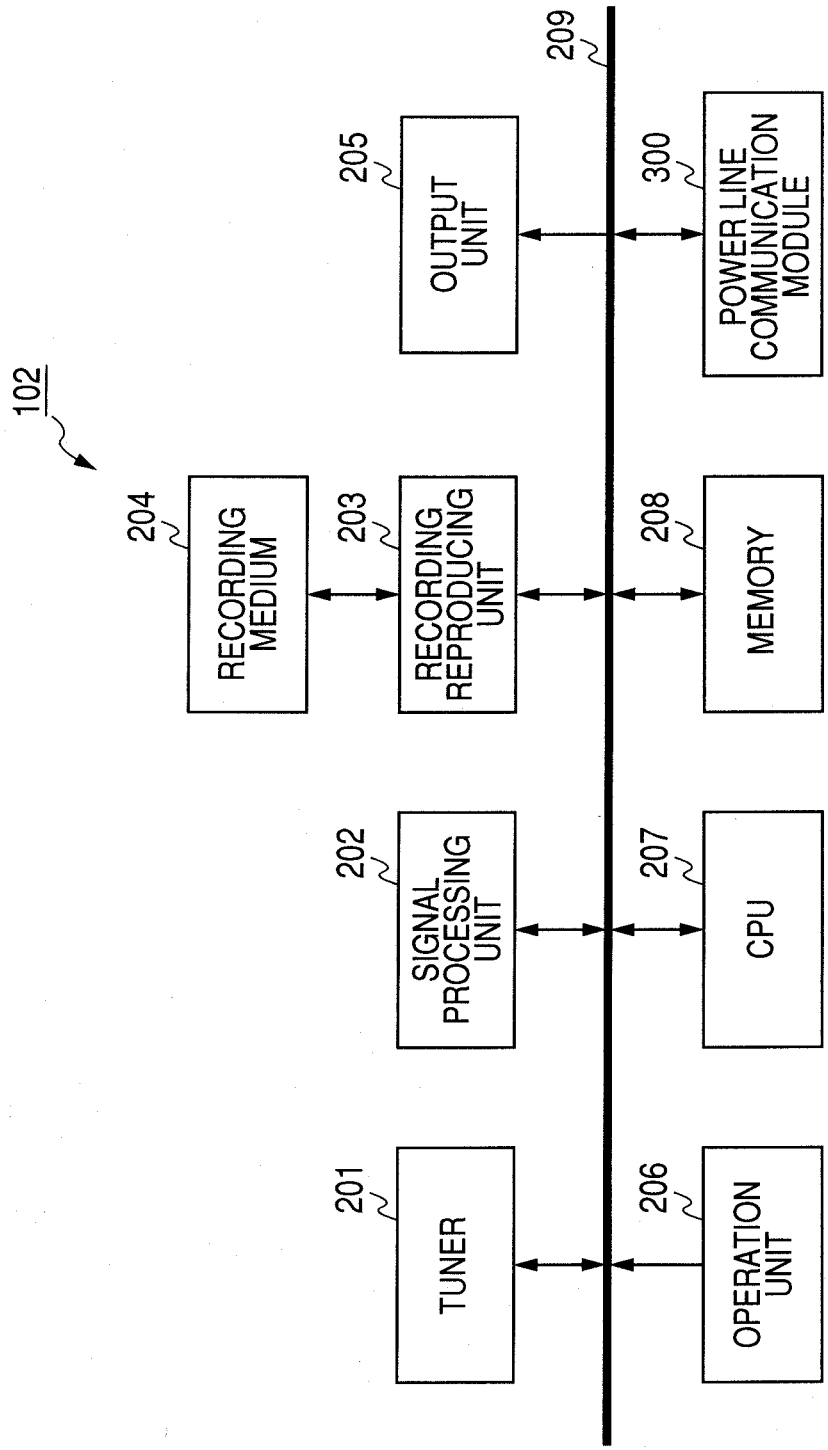
FIG. 2 is a diagram illustrating a configuration of a communication apparatus according to the exemplary embodiment.

FIG. 2 is a diagram illustrating a configuration of the recorder 102 as a communication apparatus.

In the recorder 102, a reference numeral 201 denotes a tuner which receives the television broadcast such as a digital broadcast, to output an image and audio data of a broadcast program, a reference numeral 202 denotes a signal processing unit which executes a predetermined process on the image and the audio data from the tuner 201. A reference numeral 203 denotes a recording reproducing unit which records and reproduces the image and the audio data output by the tuner 201 to a recording medium 204. An optical disk, a hard disk, or a semiconductor memory can be used as the recording medium 204.

A reference numeral 205 denotes an output unit which outputs, to an external monitor, the image and the audio data received by the tuner 201, or the image and the audio data reproduced by the recording reproducing unit 203. A reference numeral 206 denotes an operation unit, and is provided with a power switch and a variety of switches for the recording and the reproducing. A user can instruct an operation to the recorder 102 by operating the switches of the operation unit 206. The operation unit 206 can be also configured with a well-known remote controller and a receiving unit receiving a command from the remote controller.

A reference numeral 207 denotes a CPU for controlling an operation of the recorder 200, a reference numeral 208 denotes a memory storing different kinds of data for the operation by the CPU 207, and data received by the power line communication module 300, and a reference numeral 209 denotes a data bus.

The recorder 102 has a function for receiving, recording, and reproducing the television broadcast program, or a well-known scheduled recording function using an electronic program table.

The user operates the operation unit 206 to set the scheduled recording. When the scheduled recording is set by the user, the CPU 207 generates scheduled recording information including a recording start time, an end time, and a receiving channel, and stores the scheduled recording information in the memory 208.

Based on this scheduled recording information, when it becomes the recording start time, the CPU 207 controls the tuner 201 to receive a program of the designated channel, and starts recording in the recording medium 204.

The main system 200 is configured with the tuner 201, the signal processing unit 202, the recording reproducing unit 203, the recording medium 204, the output unit 205, the operation unit 206, the CPU 207, and the memory 208.

Next, the power line communication module 300 will be described.

Figure 3:
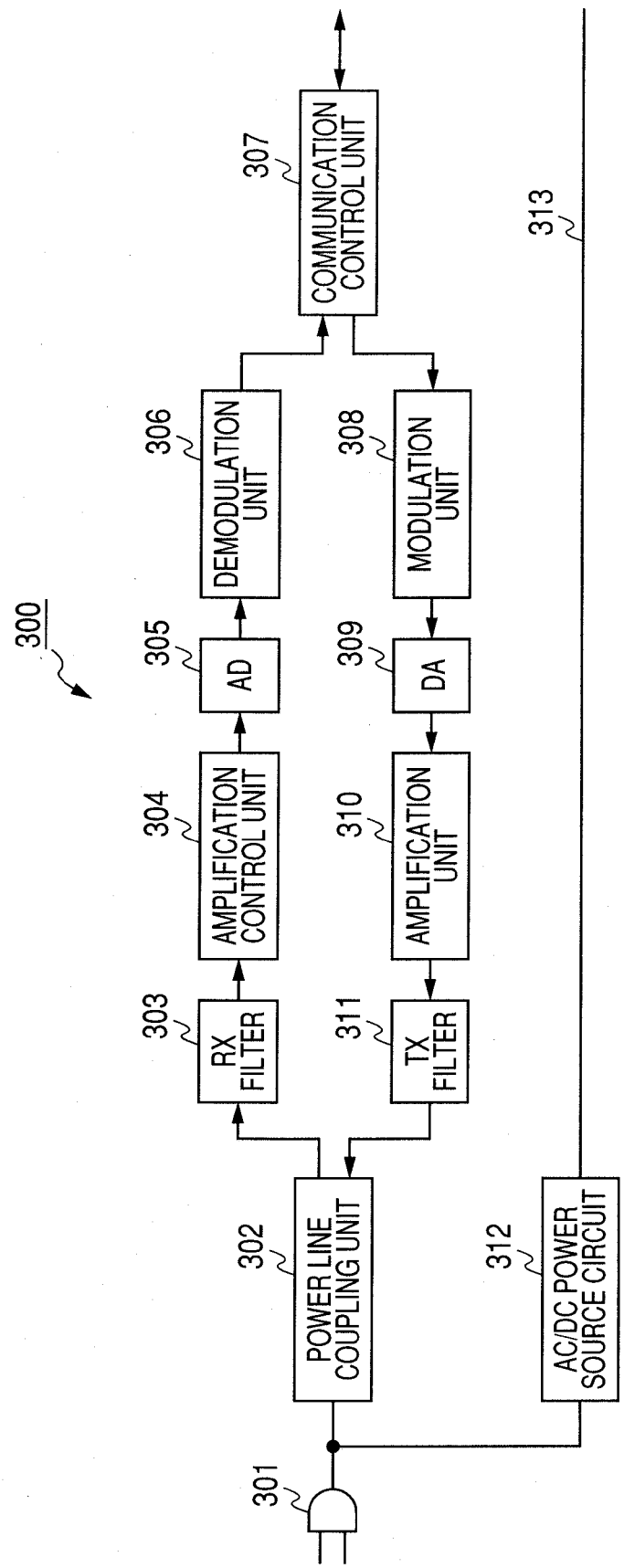
FIG. 3 is a diagram illustrating a configuration of a power line communication module.

FIG. 3 is a diagram illustrating a configuration of the power line communication module 300.

In FIG. 3, a reference numeral 301 denotes a power plug 301 which is inserted to a home power plug outlet to connect with the power line 103 of FIG. 1. Reference numeral 302 denotes a power line coupling unit which multiplexes data according to the PLC for the power line.

Reference numeral 303 denotes an RX filter which eliminates a signal component outside a band of the communication data according to the PLC from a power line supplied from the power line coupling unit 302, and a reference numeral 304 denotes an amplification control unit which adjusts a received signal level. A reference numeral 305 denotes an AD converter which converts a received signal to digital data, and a reference numeral 306 denotes a demodulation unit which demodulates the digitized data by a predetermined demodulation method. A reference numeral 307 denotes a communication control unit which transfers the demodulated digital data to the CPU 207 through the data bus 209 of FIG. 2, and outputs data transferred from the CPU 207, to a modulation unit 308. The communication control unit 307 communicates according to the IP (Internet Protocol) communication method.

A reference numeral 308 denotes the modulation unit which modulates the digital data to be transmitted by a determined method, and a reference numeral 309 denotes a DA converter which converts the modulated digital data to an analog signal. A reference numeral 310 denotes an amplification unit which amplifies the DA-converted signal to a transmittable signal level, a reference numeral 311 denotes a TX filter which eliminates an unnecessary frequency component to output the analog signal to the power line coupling unit 302.

A reference numeral 312 denotes an AC/DC power source circuit which converts an AC current supplied through the power plug 301 to a direct current 312, and supplies the direct current to each unit of FIG. 2.

The power line communication module 300 receives the data transmitted from the external apparatus 104 through the power plug 301 to transfer the received data to the CPU 207, and multiplexes the transmitted data which is output from the CPU 207, onto the power line to transmit the multiplexed data to an apparatus on the network.

The CPU 207 controls the communication control unit 307 to control to transmit data to the external apparatus 104.

Here, in the present embodiment, as long as the same method is used in each apparatus as a protocol used for the communication, any method can be used. In the present embodiment, it is assumed that the protocol for a notification is defined on the TCP/IP. As illustrated in FIG. 6, it is assumed that this protocol is simply configured with a request and a response, and the same packet configuration is used in both of the request and the response. FIG. 5 is a packet configuration example of a notification protocol, and the packet is configured with a header part 501 of the TCP/IP, a UID part 502 for identifying the present protocol, and a command part 503 for indicating a type of the request or the response. Meanwhile, in the present embodiment, while data block in the case of receiving and transmitting is sometimes described as a packet, this does not mean the communication in a specific network hierarchy.

Figure 4:
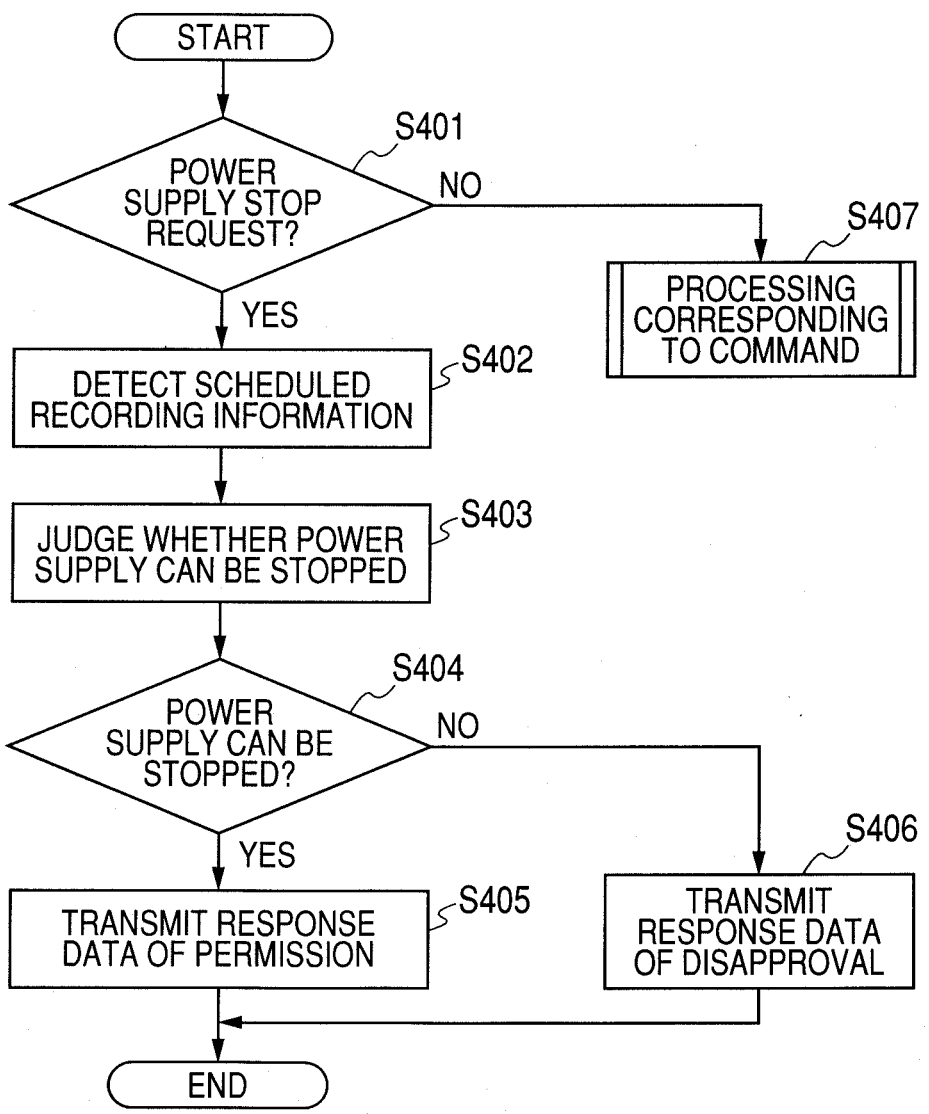
FIG. 4 is a flowchart illustrating a process when data is received from an external apparatus.

Next, a process when data transmitted from the external apparatus 104 is received will be described. FIG. 4 is a flowchart illustrating a process by the recorder 102 when the data is received. Meanwhile, since the CPU 207 controls each unit, the process of FIG. 4 is realized.

As described above, when the power line communication module 300 receives the data from the external, the flowchart of FIG. 4 is started.

The received data is stored in the memory 208. The received data stored in the memory 208 is read out, and it is determined by the UID part 502 whether or not the data corresponds to a packet of the present protocol. Next, the command part 503 is checked, and a type of the request is confirmed. Then, it is determined whether or not the transferred packet is the power supply stop notification (S401).

FIG. 7 is an exemplary command of a request used by the present protocol, and illustrates that a command value 0x00000001 is the power supply stop notification. When a value of the command part is 0x00000001, it is determined that the command is the power supply stop notification. When the command is a command other than the power supply stop notification, a process is executed which corresponds to each command (S407).

When the power supply stop notification is received, it is detected whether or not the above scheduled recording information is stored in the memory 208 (S402). It is determined based on a result of this detection whether or not the power supply may be stopped (S403).

It is determined based on the result of this determination whether or not it is permitted to stop the power supply (S404).

Here, if the scheduled recording information is not stored in the memory 208, it is determined to permit the power supply to be stopped, and the response data is transmitted which indicates the permission for the power supply stop (S405).

FIG. 8 is a diagram illustrating an exemplary command of the response data used by the present protocol. At S404, 0x80000002 indicating the permission for the power supply stop is set in the command part 503 of FIG. 5. The response data is generated, which is configured with the TCP/IP header part 501, the UID part 502, and the command part 503 in which the above value is set, and temporarily stored in the memory 208. The information used by the protocol is appropriately set in the TCP/IP header part 501. The UID part 502 is the same as a value included in the received power supply stop request packet.

The packet stored in the memory 208 is read out, and then transmitted by the power line communication module 300 to the external power line.

On the other hand, when the scheduled recording information is stored in the memory 208 at S403, it is determined that the power supply stop cannot be permitted, and the response data is transmitted, which indicates that the power supply stop is disapproved (S406).

That is, in this case, 0x80000001 illustrated in FIG. 8 is set as a value indicating the disapproval for the power supply stop request in the command part 503, and is transmitted to the external power line.

As described above, in the exemplary embodiment, when the power supply stop notification is received from the external apparatus, it is determined according to the condition of the recorder whether or not to permit the power supply stop. According to a result of the determination, the response data for permitting the power supply stop or response data for not permitting the power supply is transmitted to the external apparatus.

Thus, in such a condition that the scheduled recording is set, that is, in such a condition that any problem may be raised if the power supply is stopped for the recorder, it can be avoid to stop the power supply.

Meanwhile, in the present exemplary embodiment, when the power supply stop notification is received, it is detected at step S402 whether or not the scheduled recording information is stored. However, in addition to this detection, it can be also detected that the recording reproducing unit 203 is recording, or is reproducing.

While the recording reproducing unit 203 is recording, or is reproducing, it is determined not to permit the power supply stop, and the response data is transmitted.

In addition to the above, it is detected whether or not any function such as the recording or the reproducing is being currently executed, and it may be adapted to determine whether or not to permit the power supply stop according to a result of this detection. In addition to the scheduled recording, according to a detection whether or not the scheduled setting is executed to cause a designated function to be executed at a designated time, it may be adapted to determine whether or not the power supply stop is permitted.

Next, a second exemplary embodiment will be described.

Meanwhile, in the present exemplary embodiment, a configuration of the system is also the same as that of FIG. 1 to FIG. 3, and a basic process and a basic function are also the same as those of the above exemplary embodiment. In the present exemplary embodiment, the process is different from that of the above exemplary embodiment when the power supply stop notification is received.

Figure 9:
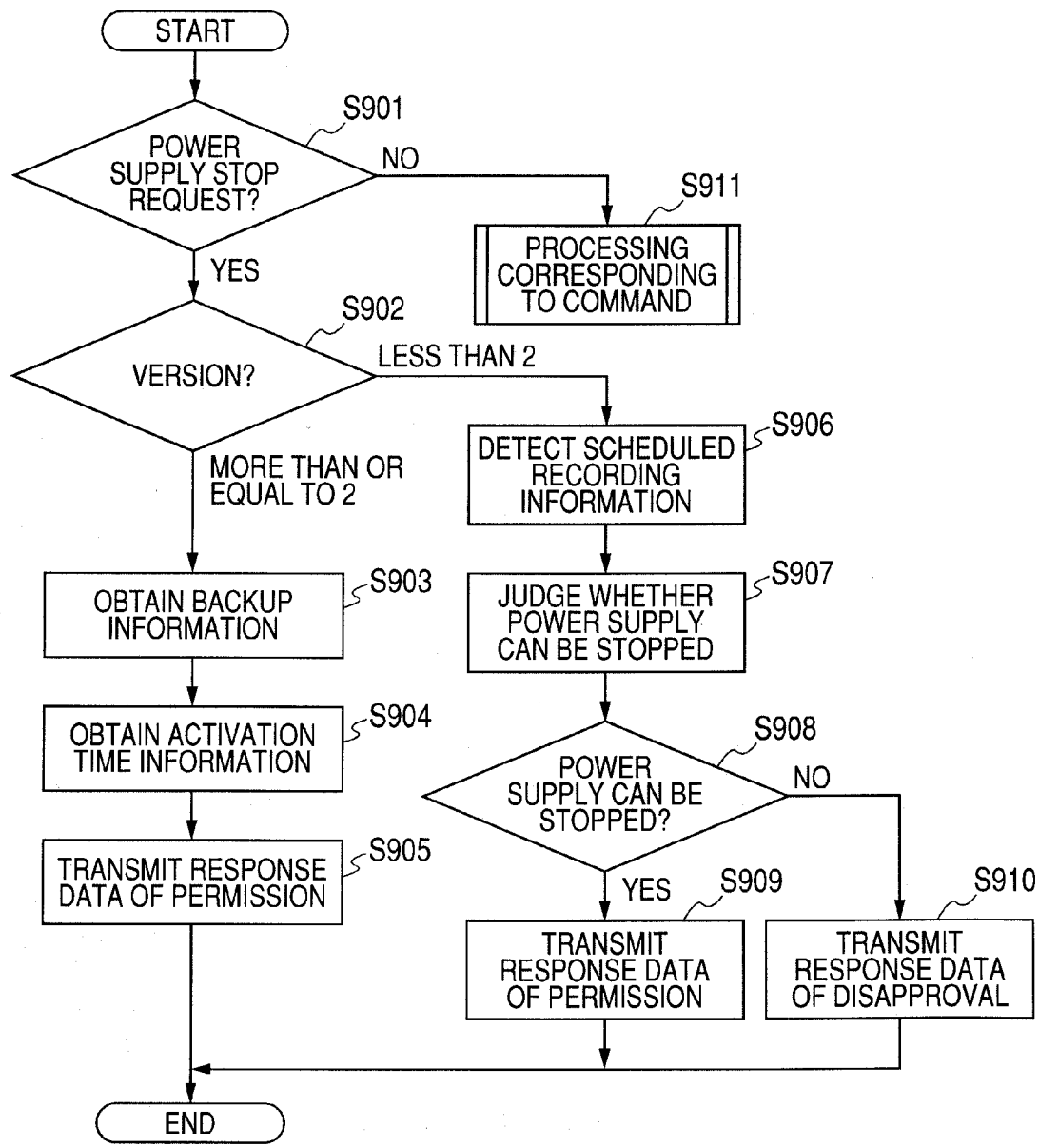
FIG. 9 is a flowchart illustrating a process when data is received from the external apparatus.

In the present exemplary embodiment, FIG. 9 is a flowchart illustrating a process of the recorder 102 when receiving data. Meanwhile, the process of FIG. 9 is realized since the CPU 207 controls each unit.

When data is received from the external by the power line communication module 300, the flowchart of FIG. 9 is started.

The received data is stored in the memory 208. The received data stored in the memory 208 is read out, and it is determined by the UID part 502 whether or not the data corresponds to a packet of the present protocol. Next, the command part 503 is checked, and a type of the request is confirmed. Then, it is determined whether or not the transferred packet is the power supply stop notification (S901).

Figure 10:
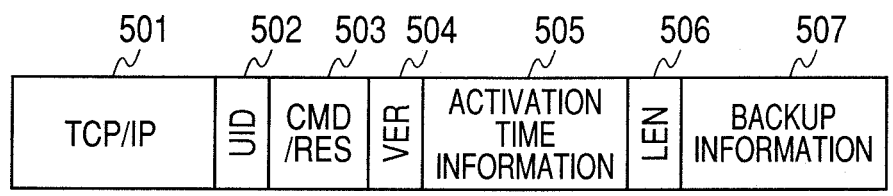
FIG. 10 is a diagram illustrating communication data.

Here, FIG. 10 illustrates a packet configuration of the present exemplary embodiment.

The packet configuration of FIG. 10 is configured with a Version part 504, an activation time information part 505, a data length part 506, and a backup information part 507, in addition to the packet configuration of FIG. 5.

The Version part 504 indicates whether or not a transmission source apparatus can transmit and receive backup information. In the present exemplary embodiment, when a value of the Version part 504 is less than two, this value indicates that the transmission source apparatus cannot transmit and receive the backup information. When the value of the Version part 504 is two or more, this value indicates that the transmission source apparatus can transmit and receive the backup information. The activation time information part 505 indicates a time in which it is necessary to supply the power at a next time. The data length part 506 indicates a length of following additional data. The backup information part 507 indicates data which is necessary to be first transmitted at the next activation.

While this packet is stored in the memory 208, the packet transmitted from the external apparatus 104 dose not include the activation time information part 505, the data length part 506, and the backup information part 507.

When the transmission source apparatus is an apparatus which can transmit and receive the backup information, the transmission source apparatus can store the backup information transmitted from the recorder 102, and when the power supply is started, the transmission source apparatus can transmit this backup information.

Thus, when the received packet is the power supply stop notification, the value of the Version part 504 is further confirmed. It is determined whether or not the transmission source apparatus is an apparatus which can transmit and receive the backup information (S902).

When the transmission source apparatus is not the apparatus which can transmit and receive the backup information, the process proceeds to S906, and in the following, the process is executed which is the same as that of FIG. 4. The processes of S906 to S910 are the same as those of S402 to S406 of FIG. 4.

On the other hand, when the transmission source apparatus is the apparatus which can transmit and receive the backup information, the backup information is obtained (S903). In the present exemplary embodiment, while the scheduled recording information stored in the memory 208 is obtained as the backup information, in addition to this information, information indicating the setting condition of the recorder 102 may be also obtained as the backup information.

Activation time information is obtained to set the time in which it is necessary to supply the power at a next time (S904). In the present exemplary embodiment, a time of five minutes before the recording start time of the scheduled recording information stored in the memory 208 is, for example, set to an activation time. This activation time is set to the activation time information part 505.

As described above, the values are set to the Version part 504, the activation time information part 505, the data length part 506, and the backup information part 507, and the response data for permitting the power supply stop is transmitted to the external apparatus 104.

Next, such a case will be described that, after the response data for permitting the power supply stop, which includes the backup information, is transmitted, the power supply is stopped, and the power supply is started again.

Figure 11:
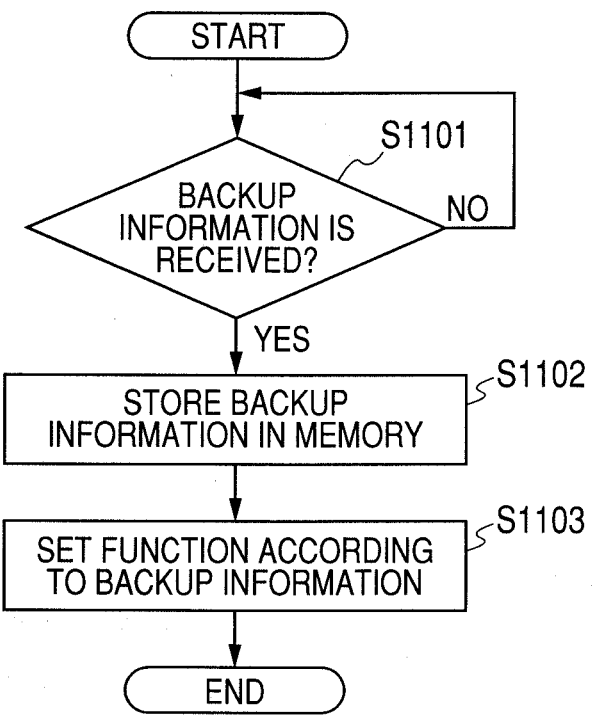
FIG. 11 is a flowchart illustrating an operation when the power supply is started.

FIG. 11 is a flowchart illustrating a process for receiving the backup information when the power supply is started. Meanwhile, the process of FIG. 11 is also realized by the CPU 207.

When the power supply is started at the activation time of the activation time information part 505, the process waits for the power line communication module 300 to receive the packet including the backup information (S1101). In the present exemplary embodiment, it is assumed that the received packet is a packet including the backup information, if the value of the command part 503 is 0x00000002 illustrated in FIG. 7.

When the packet including the backup information is received, the received backup information is stored in the memory 208 (S1102), and the setting of the recorder 102 is executed according to this backup information (S1103).

As described above, in the present exemplary embodiment, when the power supply stop notification is received, after the backup information such as the scheduled recording information is transmitted to the external apparatus, the permission for the power supply stop is transmitted.

Thus, even when the scheduled recording is set, it is possible to stop the power supply until the recording is started, and to reduce the electricity consumption.

Next, a third exemplary embodiment will be described.

In the present exemplary embodiment, the configuration of the system is also the same as that of FIG. 1. In the present exemplary embodiment, while a configuration of the recorder 102 is different from that of FIG. 2, the configuration of the power line communication module 300, and a basic process and a basic function of the recorder 102 are also the same as those of the above exemplary embodiment.

Figure 12:
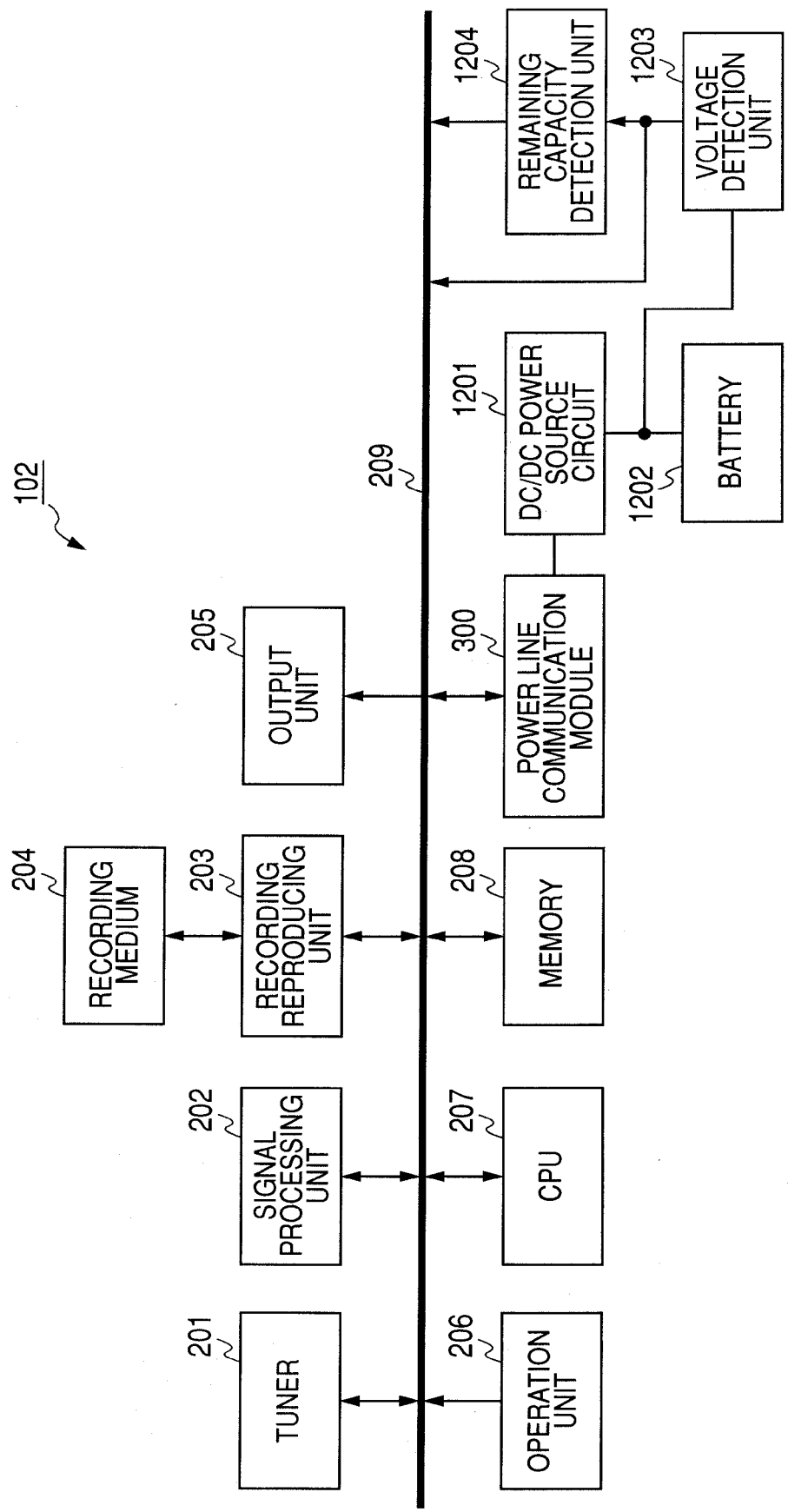
FIG. 12 is a diagram illustrating a configuration of the communication apparatus according to the exemplary embodiment.

FIG. 12 is a diagram illustrating a configuration of the recorder 102 according to the present exemplary embodiment. The same number is attached to the same block as that of FIG. 2.

In FIG. 12, a direct power source 313 supplied from the AC/DC power source circuit 312 of the power line communication module 300 is converted to a predetermined voltage by a DC/DC power source circuit 1201, and is supplied to battery 1202. The DC/DC power source circuit 1201 also supplies power sources needed by the power line communication module 300 and other blocks.

In the present exemplary embodiment, a voltage detection unit 1203 and a remaining capacity detection unit 1204 are provided. The voltage detection unit 1203 converts a voltage value of the battery 1202 to digital data, and notifies the digital data to the remaining capacity detection unit 1204. The remaining capacity detection unit 1204 compares a reference voltage of the battery 1202 with a voltage detected by the voltage detection unit 1203, measures an estimated operable time. The estimated operable time is specified by a table of a voltage value and an elapsed time.

In the present exemplary embodiment, the power can be supplied to each unit of the recorder 102 by the battery 1202.

Generally, harmonic noise is generated by a switching power source circuit used as the AC/DC power source circuit 312. In this case, since the harmonic noise is induced in the power line, the performance of the communication may be lowered. In the present exemplary embodiment, in consideration of such a problem, it is possible to stop the AC/DC power source circuit 312, and to prevent the communication performance to be lowered by driving the recorder 102 with the battery 1202 when data is communicated.

Next, in the recorder of FIG. 12, the process when data is received from the external apparatus will be described.

Figure 13:
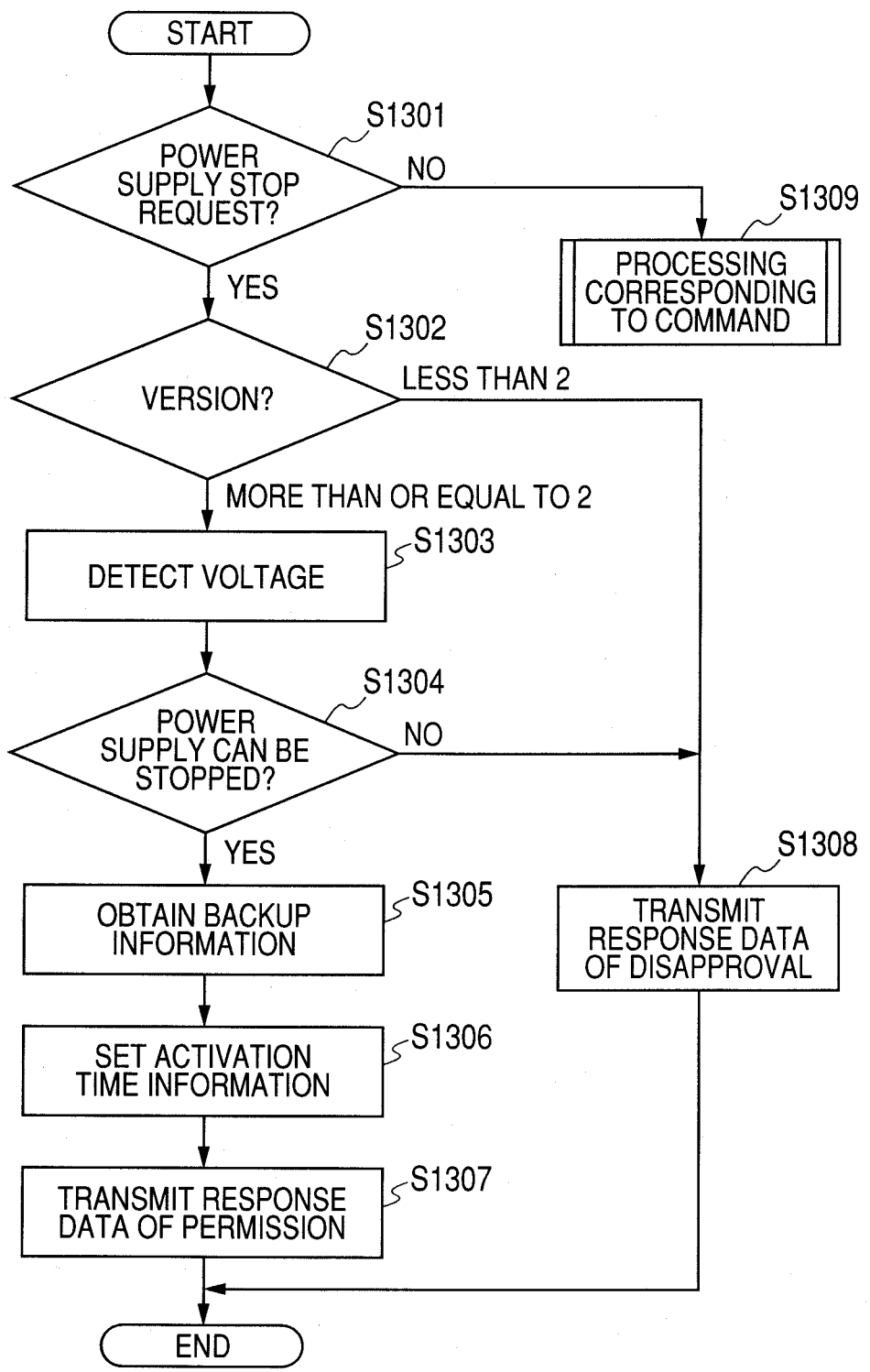
FIG. 13 is a flowchart illustrating a process when data is received from the external apparatus.

FIG. 13 is a flowchart illustrating a process of the recorder 102 when data is received in the present exemplary embodiment. Meanwhile, the process of FIG. 13 is realized since the CPU 207 controls each unit. When data is received from the external by the power line communication module 300, the flowchart of FIG. 13 is started.

The received data is stored in the memory 208. The received data stored in the memory 208 is read out, and it is determined by the UID part 502 whether or not the data corresponds to a packet of the present protocol. Next, the command part 503 is checked, and a type of the request is confirmed. It is determined whether or not the transferred packet is the power supply stop notification (S1301). The packet configuration of the present exemplary embodiment is also the same as that illustrated in FIG. 10.

When the received packet is the power supply stop notification, the value of the Version part 504 is further confirmed. It is determined whether or not the transmission source apparatus is an apparatus which can transmit and receive the backup information (S1302).

When the transmission source apparatus is not the apparatus which can transmit and receive the backup information, the response data indicating the disapproval for the power supply stop is transmitted (S1308).

On the other hand, at S1302, when the value of the Version part 504 is two or more, a voltage value is detected by the voltage detection unit 1203 (S1303), it is determined based on this voltage value whether or not the power supply stop is permitted (S1304). Here, the detected voltage value is compared with a predetermined threshold value, and when the detected voltage value is higher than the threshold value, it is determined that the power supply stop is permitted, and the process proceeds to S1305.

Next, as in the second exemplary embodiment, the backup information such as the scheduled recoding information is obtained (S1305). In addition, the activation time information is set (S1306). In the present exemplary embodiment, when the recorder 102 operates only with the battery 1202, a time when the recorder 102 becomes inoperable is calculated based on the estimated operable time detected by the remaining capacity detection unit 1204. An activation time is set based on the calculated time when the recorder 102 becomes inoperable. For example, if the calculated time is 60 minutes after the current time, the activation time is set to a time of 45 minutes after the current time, which is 15 minutes before the calculated time. Meanwhile, the activation time may not be 15 minutes before the calculated operable time, and can be set to a predetermined value.

As described above, the values are set to the Version part 504, the activation time information part 505, the data length part 506, and the backup information part 507, and the response data for permitting the power supply stop is transmitted to the external apparatus (S1307).

At S1304, when the detected voltage value is equal to or less than the threshold value, it is determined that the power supply stop is not permitted, and the process proceeds to S1308.

At S1301, when the received packet is not the power supply stop notification, the process is executed according to the received packet (S1309).

If the power supply is stopped from the power line after the response data for permitting the power supply stop, the CPU 207 switches the power for each unit of the recorder 102 from the power supplied from the power line communication module 300 to the power source by the battery 1202.

After that, when it becomes the activation time set to the activation time information part 505, the power supply is started again. The process when the power supply is started is the same as that illustrated in FIG. 11.

As described above, in present exemplary embodiment, since the power source is supplied by the battery when the power supply is being stopped, it is possible to realize to additionally reduce the electricity consumption.

Next, a fourth exemplary embodiment will be described.

Figure 14:
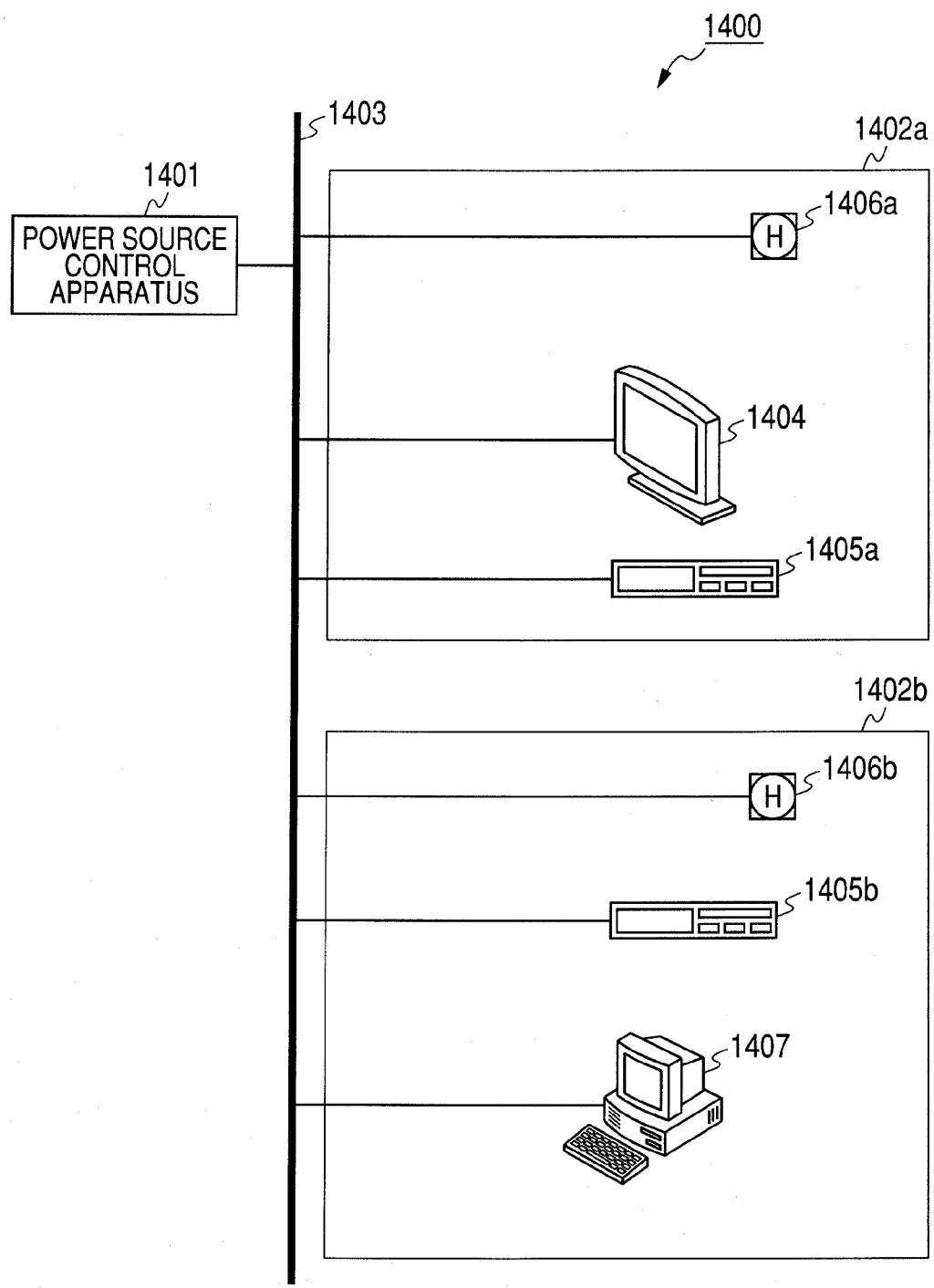
FIG. 14 is a diagram illustrating the power line communication system according to the exemplary embodiment.

FIG. 14 illustrates a configuration of a home communication system 1400 using the PLC according to the fourth exemplary embodiment.

In the communication system 1400 of FIG. 14, a power source control apparatus 1401 is connected to a home power line 1403. The power line 1403 is connected to a plurality of communication apparatuses in a plurality of rooms 1402a and 1402b. In FIG. 14, there exist a television 1404, a recorder 1405a, and a human detection sensor 1406a as the communication apparatus in the room 1402a. There exist a recorder 1405b, and a human detection sensor 1406b, and a personal computer (PC) 1407 as the communication apparatus in the room 1402b.

Like the communication apparatus 102 of FIG. 1, each of the recorder 1405a, the human detection sensor 1406a, and the television receiver 1404 is configured with the power line communication module 300 and the main system 200. Like the communication apparatus 102 of FIG. 1, each of the recorder 1405b, the human detection sensor 1406b, and the PC 1407 is also configured with the power line communication module 300 and the main system 200. Such apparatuses can communicate with the power line communication module 300 according to the PLC.

In FIG. 14, each of the recorder 1405a and the television receiver 1404 is connected to the power line 1403 by inserting a power plug to a power plug outlet of the room 1402a. Thus, each of the recorder 1405a and the television receiver 1404 is supplied with the power from the power line 1403, and communicates according to the PLC.

Each of the recorder 1405b and the PC 1407 is connected to the power line 1403 by inserting the power plug to the power plug outlet of the room 1402b. Thus, each of the recorder 1405b and the PC 1407 is supplied with the power from the power line 1403, and communicates according to the PLC.

The human detection sensors 1406a and 1406b are connected to the power line 1403 with a not-illustrated power plug, and can communicate according to the PLC. When detecting that a person is in each of the rooms 1402a and 1402b, each of the human detection sensors 1406a and 1406b transmits the fact to the power source control apparatus 1401 through the power line 1403. While a configuration of the human detection sensors 1406a and 1406b may be any configuration in which it can be detected that a person is in the room, it is assumed in the present exemplary embodiment that the human detection sensor is a human detection sensor using a infra-red ray.

A configuration of each of the recorders 1405a and 1405b is the same as that of FIG. 2, or FIG. 12.

The power source control apparatus 1401 includes the power line communication module 300 illustrated in FIG. 3, and communicates with the apparatuses of each of the rooms 1402a and 1402b according to the PLC through the power line 1403. The power source control apparatus 1401 controls the power supply to the recorder 1405a, the television receiver 1404, the recorder 1405b, and the PC 1407 according to outputs from the sensors 1406a and 1406b of the rooms 1402a and 1402b respectively.

Figure 17:
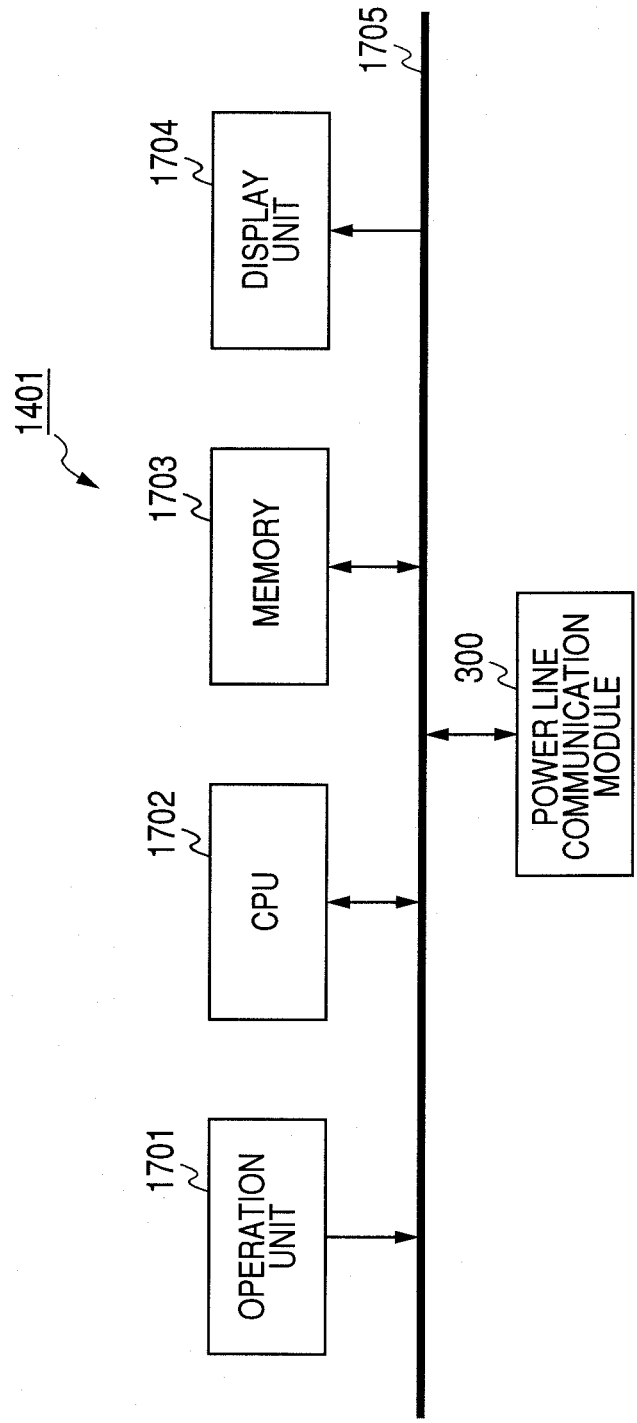
FIG. 17 is a diagram illustrating a configuration of a power controlling apparatus.

FIG. 17 illustrates a configuration of the power source control apparatus 1401.

In FIG. 17, a reference numeral 1701 denotes an operation unit provided with a variety of operation switches such as a power switch. A reference numeral 1702 denotes a CPU, a reference numeral 1703 denotes a memory, a reference numeral 1704 denotes a display unit displaying different kinds of information, and a reference numeral 1705 denotes data bus. The CPU 1701 controls the communication between each apparatus connected to the power line 1403 through the power line communication module 300, and also controls the power supply to each apparatus.

In the present exemplary embodiment, it is assumed that the communication by the PLC is the communication according to the IP, and individual protocol is not defined.

When an apparatus is connected in each of the rooms 1402a and 1402b, the power source control apparatus 1401 assigns the IP address to the apparatus, and obtains the MAC (Media Access Control) address of the apparatus. Management information is generated which relates each room to the IP address and the MAC address of a provided apparatus, and is stored in the memory 1703.

FIG. 16 illustrates content of the management information.

In the management information of FIG. 16, from a relation between a category 1601 and an apparatus ID 1602, it can be determined that the television 1404 is provided in the room 1402a. It is possible to designate the other side, to which the actual communication is executed, from a MAC address 1603 and an IP address 1604. As described above, it is possible to acknowledge the providing and connection condition of every apparatus with the power source control apparatus 1401.

Figure 15:
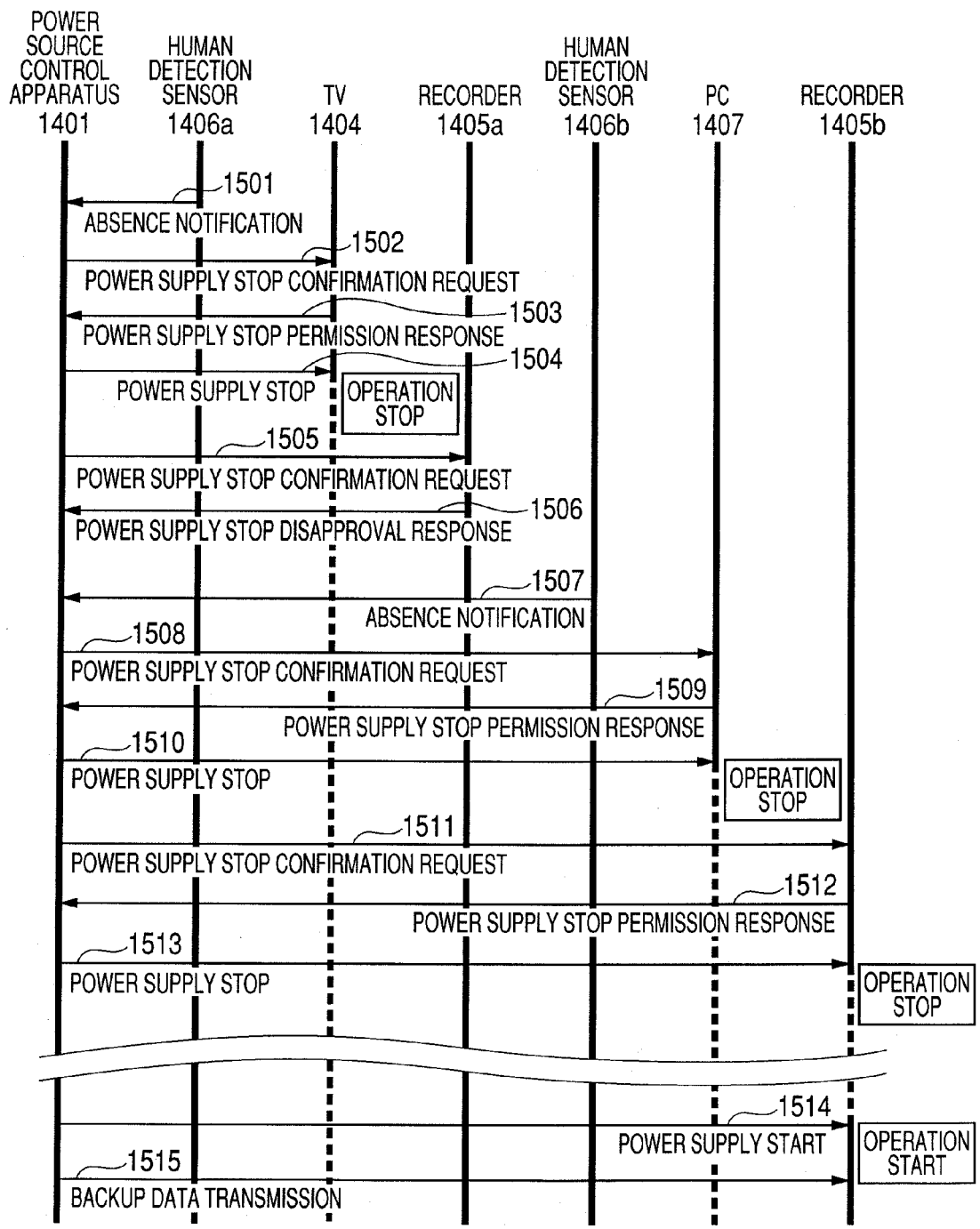
FIG. 15 is a diagram illustrating communication process in the system of FIG. 14.

Next, in the system of FIG. 14, a control operation for the power supply by the power source control apparatus 1401 according to outputs of the human detection sensors 1406a and 1406b of each room will be described based on a sequence diagram of FIG. 15.

First, at procedure 1501, when detecting that a person is not in the room 1402a, the human detection sensor 1406a transmits an absence notification to the power source control apparatus 1401.

When detecting that a person is not in the room 1402a, the power source control apparatus 1401 transmits a request for confirming the power supply stop to each apparatus provided in the room 1402a.

At procedure 1502, the power source control apparatus 1401 transmits, to the television 1404, a command for instructing whether or not the power supply may be stopped. The detail of this command is the same as that described in the first to third exemplary embodiments. When receiving the command, the television 1404 determines whether or not to permit the power supply stop.

The television 1404 includes a well-known view scheduling function using an electronic program table, and, for example, confirms whether or not a view schedule is set. When the view schedule is not set, at procedure 1503, the television 1404 transmits a response for permitting the power supply stop.

Next, at procedure 1504, the power source control apparatus 1401 stops the power supply for the television 1404.

At procedure 1505, the power source control apparatus 1401 transmits, to the recorder 1405a, a command for requesting to confirm the power supply stop. When receiving this command, like the first exemplary embodiment, the recorder 1405a confirms whether or not the scheduled recording information is maintained, and determines whether or not to permit the power supply stop.

When the recorder 1405a maintains the scheduled recording information, at procedure 1506, the television 1404 transmits, to the power source control apparatus 1401, the disposal response for the power supply stop.

As described above, when a person is not in the room 1402a, the unnecessary standby power can be reduced by stopping the power supply to each apparatus.

When detecting that a person is not in the room 1402b, at procedure 1507, the human detection sensor 1406b transmits the absence notification to the power source control apparatus 1401.

Next, when receiving the absence notification, at procedure 1508, the power source control apparatus 1401 transmits the command for requesting to confirm the power supply stop to the PC 1407. When receiving the command, the PC 1407 determines whether or not to permit the power supply stop based on the operation condition. Specifically, the PC 1407 confirms whether or not there exists an operating module function in the PC 1407.

When there does not exist the operating module in the PC 1407, at procedure 1509, the PC 1407 transmits, to the power source control apparatus 1401, the response for permitting the power supply stop.

Next, at procedure 1510, the power source control apparatus 1401 stops the power supply to the PC 1407.

In addition, at procedure 1511, the power source control apparatus 1401 transmits, to the recorder 1405b, the command for requesting to confirm the power supply stop. When receiving this command, like the second exemplary embodiment, the recorder 1405b confirms whether or not the scheduled recording information is maintained, and determines whether or not to permit the power supply stop.

When the recorder 1405b maintains the scheduled recording information, at procedure 1512, the television 1404 sets the backup information and the activation time information to a command to be transmitted, and transmits, to the power source control apparatus 1401, the response for permitting the power supply stop.

Next, at procedure 1513, the power source control apparatus 1401 stops the power supply to the recorder 1405b.

As described above, when a person is not in the room 1402b, the unnecessary standby power can be reduced by stopping the power supply to each apparatus.

Here, at procedure 1512, the recorder 1405b transmits, to the power source control apparatus 1401, the scheduled recording information and the activation time information.

Thus, when it becomes the set activation time, at procedure 1514, the power source control apparatus 1401 starts the power supply to the recorder 1405b. After that, at procedure 1515, the power source control apparatus 1401 transmits the scheduled recording information to the recorder 1405b.

As described above, even when the scheduled recording information is maintained in the recorder 1405b, it is possible to stop the power supply, and to expect the additionally reduction for the electricity consumption.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-203241, filed Aug. 3, 2007, which is hereby incorporated by reference herein in its entirety.

The invention claimed is:

1. A communication apparatus, comprising:
a connecting unit that connects with a power line;
a receiving unit that receives a power supply through the connecting unit;
a communicating unit that receives from an external apparatus, which is connected with the power line, through the connecting unit a command by using a power line communication and transmits to the external apparatus through the connecting unit a response to the command by using the power line communication; and
a controlling unit that determines whether or not to permit a power supply stop, in accordance with the communicating unit receiving from the external apparatus notification to stop the power supply through the connecting unit, and controls the communicating unit such that the communicating unit transmits to the external apparatus through the connecting unit response data corresponding to the determination as a response to the notification to stop the power supply,
wherein the controlling unit controls, in accordance with a determination to permit the power supply stop, the communicating unit to transmit to the external apparatus, from which the notification to stop the power supply is transmitted, through the connecting unit response data indicating a permission for the power supply stop and information for setting a schedule which causes a designated function to be executed at a designated time, and
wherein the controlling unit controls, in accordance with a start of the power supply, the communicating unit to receive from the external apparatus through the connecting unit the information for setting the schedule.

2. The communication apparatus according to claim 1, wherein the controlling unit determines whether or not to permit the power supply stop, according to an operation condition of the communication apparatus.

3. The communication apparatus according to claim 1, wherein the controlling unit determines whether or not to permit the power supply stop, according to whether or not there exists an executing function.

4. The communication apparatus according to claim 1, wherein the controlling unit determines whether or not to permit the power supply stop, according to whether or not a schedule which causes a designated function to be executed at a designated time is set.

5. The communication apparatus according to claim 1, wherein the controlling unit determines whether or not to permit the power supply stop, according to whether or not the external can receive the information for setting the schedule.

6. The communication apparatus according to claim 5, wherein characterized in that when the external apparatus cannot receive the information for setting the schedule, the controlling unit determines whether or not to permit the power supply stop, according to whether or not the schedule has been set.

7. The communication apparatus according to claim 1, wherein when determining to permit the power supply stop, the controlling unit controls the communicating unit to transmit to the external apparatus through the connecting unit the response data indicating the permission for the power supply stop, together with time information on a time for resuming the power supply.

8. The communication apparatus according to claim 7, wherein the controlling unit sets a value of the time information on the basis of the information for setting the schedule.

9. The communication apparatus according to claim 7, wherein the receiving unit can also receive the power supply from a battery, and the controlling unit sets the time information on the basis of remaining capacity of the battery.

10. The communication apparatus according to claim 1, wherein the receiving unit can also receive the power supply from the battery, and the controlling unit also determines whether or not to permit the power supply stop, according to the remaining capacity of the battery.

11. The communication apparatus according to claim 1, further comprising:

a tuner that receives a television broadcast and outputting an image signal of a broadcast program;

a recording unit that records the image signal output from the tuner on a recording medium;

a setting unit that sets a scheduled recording by the recording unit, wherein the information for setting the schedule includes information for the scheduled recording set by the setting unit.

12. A communication method of receiving a power supply from a power line and communicating through the power line between a communication apparatus connected with the power line and an external apparatus connected with the power line, comprising the steps of:

receiving from the external apparatus through the power line notification to stop the power supply by the communication apparatus, the communication apparatus receiving from the external apparatus a command by using a power line communication and transmitting to the external apparatus a response to the command by using the power line communication;

determining whether or not to permit a power supply stop, in accordance with the notification, which is received from the external apparatus through the power line by the communication apparatus, to stop the power supply;

transmitting, from the communication apparatus to the external apparatus through the power line, response data corresponding to a result of the determination as a response to the notification to stop the power supply;

in accordance with a determination to permit the power supply stop, transmitting to the external apparatus through the power line, in addition to the response data, information for setting a schedule which causes a designated function to be executed at a designated time; and in accordance with a start of the power supply, receiving from the external apparatus through the power line the information for setting the schedule.

* * * * *